US011086379B2

(12) United States Patent
Guyer et al.

(10) Patent No.: US 11,086,379 B2
(45) Date of Patent: Aug. 10, 2021

(54) EFFICIENT STORAGE SYSTEM BATTERY BACKUP USAGE THROUGH DYNAMIC IMPLEMENTATION OF POWER CONSERVATION ACTIONS

(71) Applicant: EMC IP HOLDING COMPANY LLC, Hopkinton, MA (US)

(72) Inventors: James Guyer, Northboro, MA (US); Clifford Lim, Hopkinton, MA (US); Scott Gordon, Upton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 72 days.

(21) Appl. No.: 16/665,053

(22) Filed: Oct. 28, 2019

(65) Prior Publication Data

US 2021/0124405 A1    Apr. 29, 2021

(51) Int. Cl.
  *G06F 1/30* (2006.01)
  *G06F 1/32* (2019.01)
  *G06F 1/3234* (2019.01)
  *G06F 1/324* (2019.01)
  *G06F 1/3287* (2019.01)

(52) U.S. Cl.
  CPC ............ *G06F 1/30* (2013.01); *G06F 1/324* (2013.01); *G06F 1/3275* (2013.01); *G06F 1/3287* (2013.01)

(58) Field of Classification Search
  CPC .......... G06F 1/30; G06F 1/324; G06F 1/3275; G06F 1/3287
  See application file for complete search history.

(56) References Cited

U.S. PATENT DOCUMENTS

| | | | | |
|---|---|---|---|---|
| 2004/0111596 | A1* | 6/2004 | Rawson, III | G06F 1/3268 713/1 |
| 2010/0332869 | A1* | 12/2010 | Hsin | G06F 1/329 713/320 |
| 2012/0054520 | A1* | 3/2012 | Ben-Tsion | G06F 1/30 713/322 |
| 2013/0339770 | A1* | 12/2013 | Tu | G06F 1/3212 713/320 |
| 2015/0023101 | A1* | 1/2015 | Tanaka | G11C 16/20 365/185.11 |
| 2017/0329638 | A1* | 11/2017 | Ragupathi | G06F 1/30 |
| 2020/0379535 | A1* | 12/2020 | Goodson, II | G06F 1/30 |

* cited by examiner

*Primary Examiner* — Stefan Stoynov
(74) *Attorney, Agent, or Firm* — Anderson Gorecki LLP

(57) ABSTRACT

Power conservation logic for a storage node operates in parallel with an emergency shutdown process in which an emergency power source is engaged and data and metadata are destaged from volatile memory to non-volatile managed drives. The power conservation logic serially implements power conservation actions until enough reserve power is available to complete the emergency shutdown process. The power conservation logic may learn how much power savings are realized from each conservation action and adjust the order in which the conservation actions are serially implemented, e.g. in order from greatest to least power consumption reduction.

20 Claims, 3 Drawing Sheets

EFFICIENT STORAGE SYSTEM BATTERY BACKUP USAGE THROUGH DYNAMIC IMPLEMENTATION OF POWER CONSERVATION ACTIONS

TECHNICAL FIELD

The subject matter of this disclosure is generally related to data storage systems, and more particularly to emergency shutdown procedures for data storage systems.

BACKGROUND

Data centers are used to maintain large data sets, e.g. hundreds of gigabytes, associated with critical functions for which avoidance of data loss and maintenance of data availability are important. Key building blocks of a data center may include host servers, NAS (network-attached storage), and SANs (storage area networks). NAS servers and gateways can be used to provide multiple client computers with file-level access to the same logical volume of data. The files that are stored by a NAS server on a logical volume may be presented in a folder or other standard OS (operating system) feature on each client computer. A SAN can be used to provide multiple host servers with block-level access to the same logical volume of data. The SAN includes a network of compute nodes that manage access to arrays of drives. SANs create logical volumes of storage that are used by instances of host applications such as block servers and email servers that run on the host servers. Each logical volume has a volume ID and contiguous logical address space. The host servers send block-level IO (input-output) commands to the SAN to access the logical volumes. Because they are block-based, SANs are unaware of higher-level data structures such as files. SANs have advantages over NAS in terms of potential storage capacity and scalability, but file-based NAS systems may be preferred by some organizations based on ease of use.

Storage systems may be equipped with a reserve power source for emergency shutdown. The reserve power source is used to copy the contents of volatile memory to non-volatile storage in order to avoid data loss when line power is lost. A common type of reserve power source is a lithium ion battery. Problematically, the batteries needed for SAN and NAS nodes tend to be large, costly, and trigger strict shipping regulations and EPO (emergency power off) standards.

SUMMARY

All examples, aspects and features mentioned in this document can be combined in any technically possible way.

In accordance with some implementations a method comprises: implementing parallel processes with a storage node, comprising: an emergency shutdown process comprising: engaging an emergency power source; and destaging data and metadata from volatile memory to non-volatile storage; and a power conservation process comprising: serially implementing ones of a plurality of power conservation actions until enough reserve power is available to complete the emergency shutdown process. In some implementations serially implementing ones of the plurality of power conservation actions comprises reducing processor power level. In some implementations serially implementing ones of the plurality of power conservation actions comprises depowering unused managed drives. In some implementations serially implementing ones of the plurality of power conservation actions comprises parking unnecessary processor cores. In some implementations serially implementing ones of the plurality of power conservation actions comprises depowering host interfaces. In some implementations serially implementing ones of the plurality of power conservation actions comprises reducing processor clock speed. In some implementations serially implementing ones of the plurality of power conservation actions comprises reducing memory clock speed. In some implementations serially implementing ones of the plurality of power conservation actions comprises reducing system cooling. In some implementations serially implementing ones of the plurality of power conservation actions comprises depowering of a system fabric interface. In some implementations serially implementing ones of the plurality of power conservation actions comprises depowering of interfaces to managed drives. Some implementations comprise estimating power savings from each of the conservation actions. Some implementations comprise implementing the power conservation actions serially in an order based on the estimated power savings.

In accordance with some implementations an apparatus comprises: a storage node comprising: at least one computing node comprising volatile memory and a processor; a plurality of non-volatile managed drives; and power conservation logic that operates in parallel with an emergency shutdown process in which an emergency power source is engaged and data and metadata are destaged from the volatile memory to non-volatile managed drives, the power conservation logic comprising power conservation actions that are serially implemented until enough reserve power is available to complete the emergency shutdown process. In some implementations the power conservation actions comprise instructions that reduce processor power level. In some implementations the power conservation actions comprise instructions that depower unused managed drives. In some implementations the power conservation actions comprise instructions that park unnecessary processor cores. In some implementations the power conservation actions comprise instructions that depower host interfaces. In some implementations the power conservation actions comprise instructions that reduce processor clock speed. In some implementations the power conservation actions comprise instructions that reduce memory clock speed. In some implementations serially implementing ones of the plurality of power conservation actions comprises reducing system cooling. In some implementations serially implementing ones of the plurality of power conservation actions comprises depowering of a system fabric interface. In some implementations serially implementing ones of the plurality of power conservation actions comprises depowering of interfaces to managed drives. In some implementations the power conservation logic estimates power savings from each of the conservation actions. In some implementations the power conservation logic implements the power conservation actions serially in an order based on the estimated power savings.

Other aspects, features, and implementations may become apparent in view of the detailed description and figures.

DETAILED DESCRIPTION

Aspects of the inventive concepts will be described as being implemented in a data storage system that includes a host server and storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For ease of exposition, not every step, device, or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computing devices could operate simultaneously on one physical computing device. The term "logic" is used to refer to special purpose physical circuit elements, firmware, software, computer instructions that are stored on a non-transitory computer-readable medium and implemented by multi-purpose tangible processors, and any combinations thereof.

Figure 1:
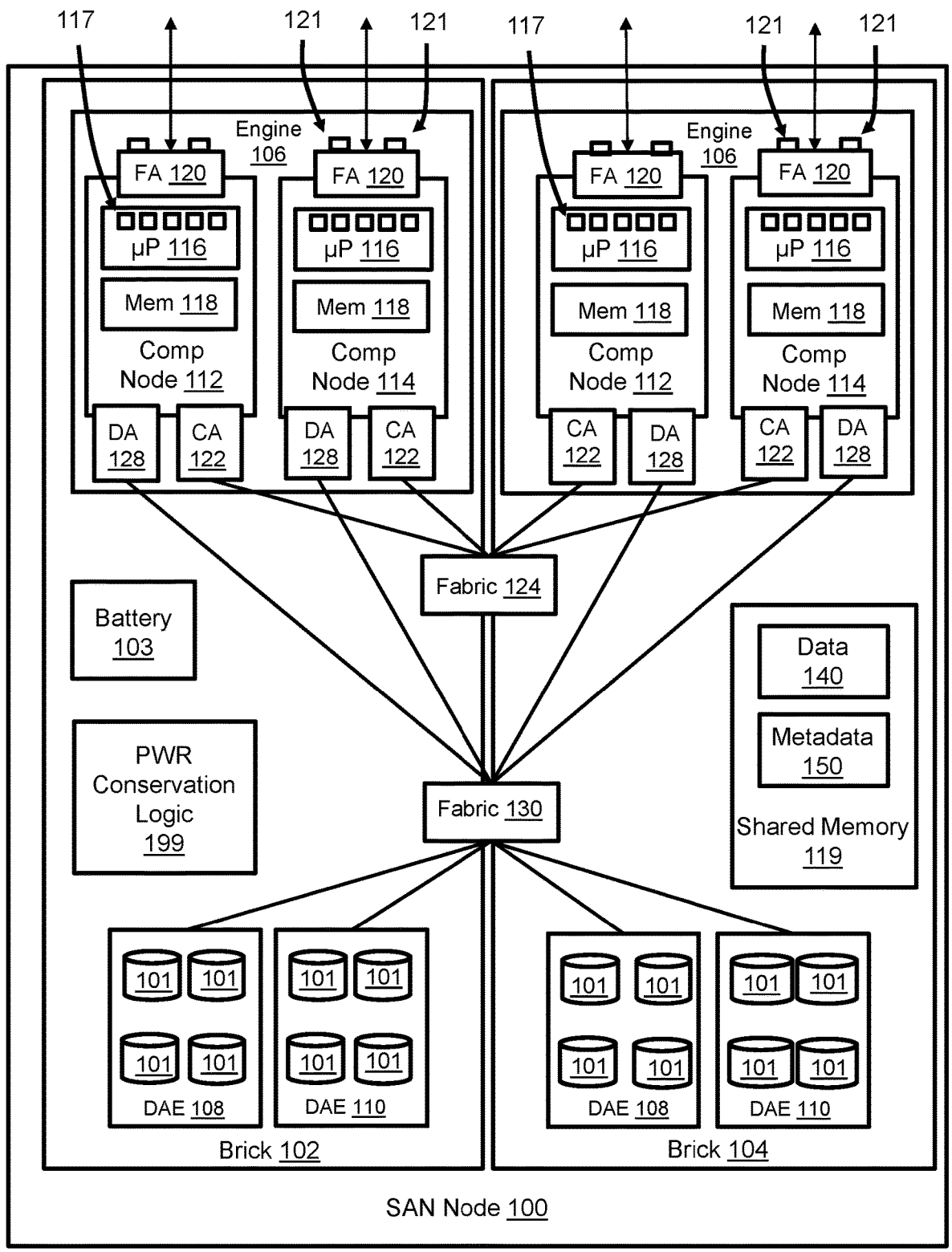
FIG. 1 illustrates a SAN node with power conservation logic for emergency shutdown.

FIG. 1 illustrates a SAN node 100 with power conservation logic 199. The power conservation logic implements actions to help assure avoidance of data loss in the event of an emergency shutdown in which line power is lost. A battery 103 or other emergency power source is included to provide power to the SAN node to complete emergency shutdown procedures without line power. The SAN node is intended to provide context. The invention is not limited to SAN nodes.

The SAN node 100, which may be referred to as a storage array, includes one or more bricks 102, 104. Each brick includes an engine 106 and one or more drive array enclosures (DAEs) 108, 110. Each DAE includes managed drives 101 of one or more technology types. Examples may include, without limitation, solid state drives (SSDs) such as flash and hard disk drives (HDDs) with spinning disk storage media with some known storage capacity. Each DAE might include any number of managed drives, but the figure is simplified for purposes of illustration. Each engine 106 includes a pair of interconnected computing nodes 112, 114, which are sometimes referred to as "storage directors." Each computing node includes at least one multi-core processor 116 and local memory 118. The processor may include CPUs, GPUs, or both, and the number of cores 117 is known. The local memory 125 may include volatile random-access memory (RAM) of any type. Each computing node includes one or more front-end adapters (FAs) 120 with ports 121 for communicating with the hosts. The FAs have ports and the hosts may access the SAN node via multiple ports in a typical implementation. Each computing node also includes one or more drive adapters (DAs) 122 for communicating with the managed drives 101 in the DAEs 108, 110. Each computing node may also include one or more channel adapters (CAs) 122 for communicating with other computing nodes via an interconnecting fabric 124. Each computing node may allocate a portion or partition of its respective local memory 118 to a shared memory 119 that can be accessed by other computing nodes, e.g. via direct memory access (DMA) or remote direct memory access (RDMA). The paired computing nodes 112, 114 of each engine 106 provide failover protection and may be directly interconnected by communication links. An interconnecting fabric 130 enables implementation of an N-way active-active backend. A backend connection group includes all DAs that can access the same drive or drives. In some implementations every DA 128 in the storage array can reach every DAE via the fabric 130. Further, in some implementations every DA in the SAN node can access every managed drive 101 in the SAN node.

The managed drives 101 are not discoverable by the hosts but the SAN node 100 creates a logical storage device that can be discovered and accessed by the hosts. The logical storage device is used by host applications for storage of host application data. Without limitation, the logical storage device may be referred to as a production volume, production device, or production LUN, where LUN (Logical Unit Number) is a number used to identify the logical storage volume in accordance with the SCSI (Small Computer System Interface) protocol if that is supported (the inventive aspects are not limited to use with any specific protocols or type of storage system). From the perspective of the hosts the logical storage device is a single drive having a set of contiguous fixed-size logical block addresses (LBAs) on which data used by instances of the host application resides. However, the host application data is stored at non-contiguous addresses on various managed drives 101.

To service IOs from instances of a host application the SAN node 100 maintains metadata 150 that indicates, among various things, mappings between LBAs of the logical storage device and addresses with which extents of host application data can be accessed from the shared memory 119 and managed drives 101. In response to a data access command from an instance of the host application to read data from the production volume the SAN node uses the metadata 150 to find the requested data in the shared memory or managed drives. Some host application data 140, e.g. recently accessed data, is present in the shared memory. The data 140 in the shared memory is paged-in and paged-out based on need and least recent use. When the requested data is already present in shared memory when the command is received it is considered a "cache hit." When the requested data is not in the shared memory when the command is received it is considered a "cache miss." In the event of a cache miss the accessed data is temporarily copied into the shared memory 119 from the managed drives 101 and used to service the IO, i.e. reply to the host application with the data via one of the computing nodes. The least recently used data in the shared memory may be paged-out to free space for the data being copied into the shared memory. In the case of an IO to write data to the production volume the SAN node copies the data into the shared memory 119, marks the corresponding logical storage device location as dirty in the metadata 150, and creates new metadata that maps the logical storage device address with a location to which the data is eventually written on the managed drives. Read and write "hits" and "misses" occur depending on whether the stale data associated with the IO is present in the shared memory when the IO is received.

During normal operation the portion of the shared memory used to maintain data 140 may become full. Some of that data 140 may only exist in the shared memory. Various associated new and updated metadata 150 records may exist only in the shared memory until there is spare processing capacity to destage those metadata records to the managed drives. In the event of an emergency shutdown, any of the data 140 and metadata 150 that has not been destaged from volatile memory when all power is lost may be lost. Consequently, a significant amount of data and metadata may have to be destaged from the shared memory to the managed drives to avoid data and metadata loss in the event of an emergency shutdown.

Figure 2:
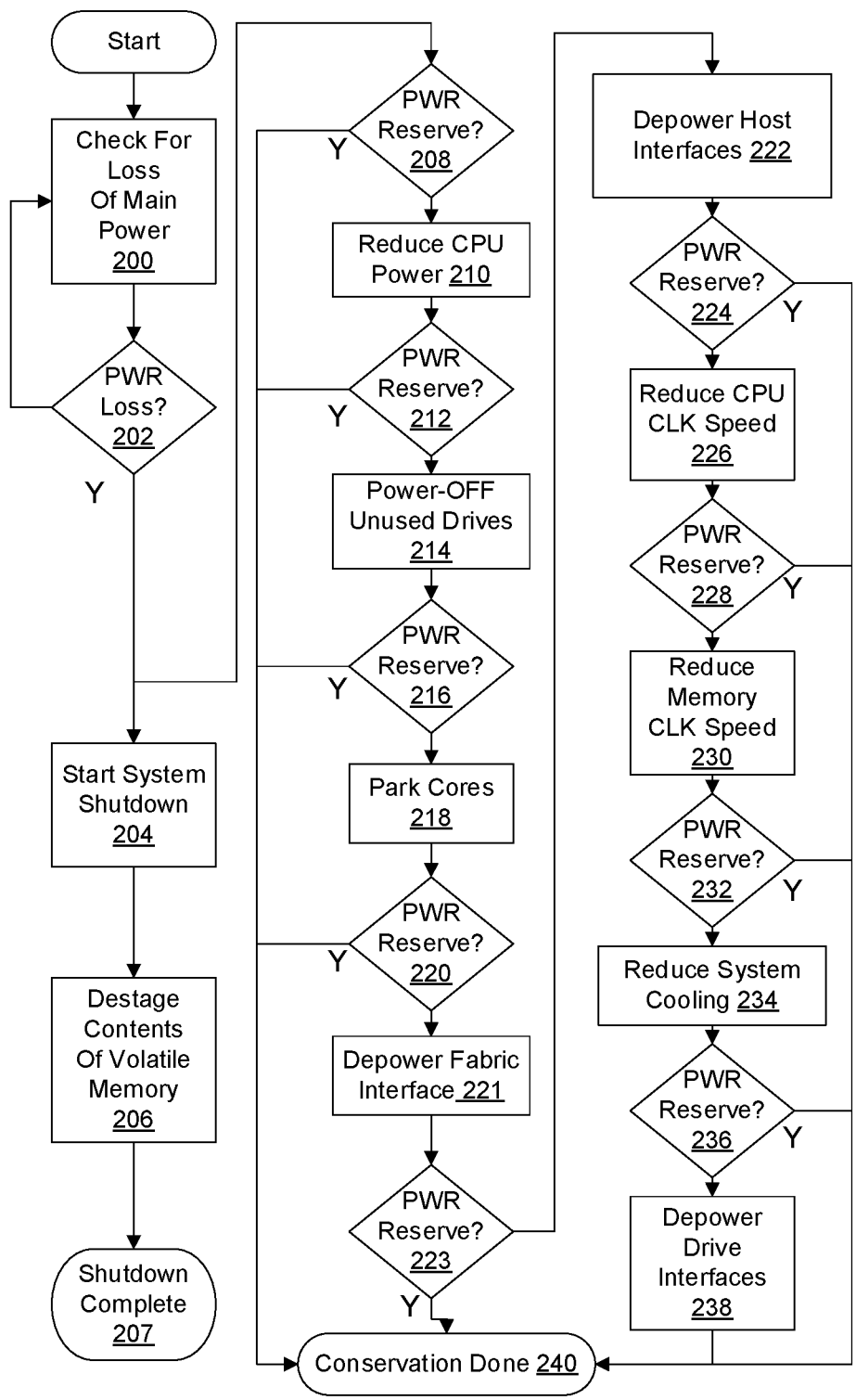
FIG. 2 illustrates operation of the power conservation logic of FIG. 1.

FIG. 2 illustrates operation of the power conservation logic 199 of FIG. 1. Starting during normal operation the power conservation logic iteratively checks for loss of main (line) power as indicated by steps 200 and 202. If loss of main power is detected at step 202 then system emergency shutdown and power conservation procedures are triggered in parallel. Emergency system shutdown is triggered as indicated in step 204, which may include engaging the emergency power source (e.g., battery 103 (FIG. 1), sending status messages, and generating logs. As indicated in step 206, the contents of the volatile memory, including dirty and new metadata and data in the shared memory, are destaged to the managed drives or some other non-volatile storage. Emergency shutdown, which includes steps 204 and 206, is then considered complete as indicated in step 207.

The parallel process of power conservation includes multiple possible power usage reducing actions that may be considered and/or implemented serially in any order. Moreover, as will be discussed below, some actions may be implemented before the destaging step 206. The power conservation logic initially determines whether the emergency power source has enough reserve power to complete system shutdown as indicated at step 208. If enough reserve power is available, then the power conservation process may be considered done as indicated in step 240. If enough reserve power is unavailable, CPU power is reduced as indicated in step 210. For example, CPU power may be reduced to the lowest practical level at which the shutdown process can continue. The power conservation logic again determines whether the emergency power source has enough reserve power to complete shutdown as indicated at step 212. If enough reserve power is available, the power conservation process may be considered done as indicated in step 240. If enough reserve power is unavailable, unused managed drives are powered OFF as indicated in step 214. Unused drives may include managed drives to which no metadata or data needs to be destaged to complete shutdown. The power conservation logic again determines whether the emergency power source has enough reserve power to complete shutdown as indicated at step 216. If enough reserve power is available, the power conservation process may be considered done as indicated in step 240. If enough reserve power is unavailable, unnecessary processor cores are parked as indicated in step 218. Unnecessary cores may include cores that are not running threads associated with the shutdown and power conservation processes. The power conservation logic again determines whether the emergency power source has enough reserve power to complete shutdown as indicated at step 220. If enough reserve power is available, the power conservation process may be considered done as indicated in step 240. If enough reserve power is unavailable, unnecessary fabric interfaces are depowered as indicated in step 221. The power conservation logic again determines whether the emergency power source has enough reserve power to complete shutdown as indicated at step 223. If enough reserve power is available, the power conservation process may be considered done as indicated in step 240. If enough reserve power is unavailable, host interfaces are depowered as indicated in step 222. This may include shutdown of some or all FA ports, entire FAs, or a combination thereof. The power conservation logic again determines whether the emergency power source has enough reserve power to complete shutdown as indicated at step 224. If enough reserve power is available, the power conservation process may be considered done as indicated in step 240. If enough reserve power is unavailable, CPU clock speed is reduced as indicated in step 226. The power conservation logic again determines whether the emergency power source has enough reserve power to complete shutdown as indicated at step 228. If enough reserve power is available, the power conservation process may be considered done as indicated in step 240. If enough reserve power is unavailable, shared memory clock speed is reduced as indicated in step 226. The power conservation logic again determines whether the emergency power source has enough reserve power to complete shutdown as indicated at step 232. If enough reserve power is available, the power conservation process may be considered done as indicated in step 240. If enough reserve power is unavailable, system cooling is reduced as indicated in step 234. This may include reduction of cooling fan speed and/or depowering some or all cooling fans. The power conservation logic again determines whether the emergency power source has enough reserve power to complete shutdown as indicated at step 236. If enough reserve power is available, the power conservation process may be considered done as indicated in step 240. If enough reserve power is unavailable, unnecessary drive interfaces are depowered as indicated in step 238. The illustrated actions are not intended to be exhaustive. Any hardware system and subsystem may be subjected to power reduction and depowering as a power conservation action. When all available power conservation actions have been taken then the power conservation process is considered done as indicated in step 240.

Figure 3:
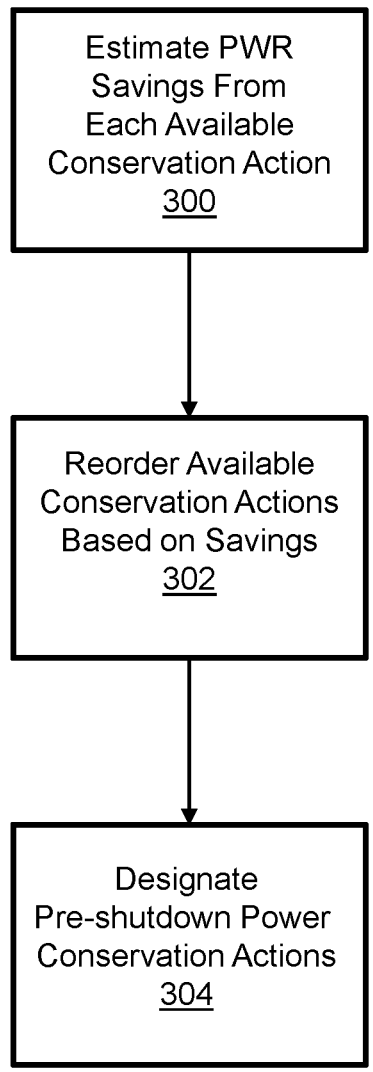
FIG. 3 further illustrates operation of the power conservation logic of FIG. 1.

FIG. 3 further illustrates operation of the power conservation logic 199 of FIG. 1. The illustrated steps may be implemented during normal operation of the SAN node, e.g. prior to and/or following emergency shutdown. Power savings from each available conservation action is estimated as indicated in step 300. This may include learning from calculated or measured power draw before and after implementing certain power conservation actions in previous emergency shutdowns. The available power conservation actions are reordered based on the estimated power savings as indicated in step 302. This may include placing the power conservation actions in an order of implementation from greatest to least estimated power savings so that at each successive step the most effective power conservation action is implemented. Pre-shutdown power conservation actions may be designated as indicated in step 304. Designated actions may be implemented before commencing step 206

(FIG. 2). For example, CPU power reduction, core parking and reduced CPU clock speed may be designated actions in some implementations.

In some implementations the power conservation logic may advantageously enable use of less reserve power and thus lower capacity batteries. For example, and without limitation, the power conservation logic may enable use of batteries that do not trigger EPO standards and can be shipped with fewer restrictions. Smaller battery capacity may also translate to smaller system size and lower cost.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
    implementing parallel processes with a storage node, comprising:
        an emergency shutdown process comprising:
            engaging an emergency power source; and
            destaging data and metadata from volatile memory to non-volatile storage; and
        a power conservation process comprising:
            serially implementing ones of a plurality of power conservation actions until enough reserve power is available to complete the emergency shutdown process.

2. The method of claim 1 wherein serially implementing ones of the plurality of power conservation actions comprises reducing processor power level.

3. The method of claim 1 wherein serially implementing ones of the plurality of power conservation actions comprises depowering unused managed drives and associated interfaces.

4. The method of claim 1 wherein serially implementing ones of the plurality of power conservation actions comprises parking unnecessary processor cores.

5. The method of claim 1 wherein serially implementing ones of the plurality of power conservation actions comprises depowering host interfaces.

6. The method of claim 1 wherein serially implementing ones of the plurality of power conservation actions comprises reducing processor clock speed.

7. The method of claim 1 wherein serially implementing ones of the plurality of power conservation actions comprises reducing memory clock speed.

8. The method of claim 1 wherein serially implementing ones of the plurality of power conservation actions comprises reducing system cooling.

9. The method of claim 1 comprising estimating power savings from each of the conservation actions.

10. The method of claim 9 comprising implementing the power conservation actions serially in an order based on the estimated power savings.

11. An apparatus comprising:
    a storage node comprising:
        at least one computing node comprising volatile memory and a processor;
        a plurality of non-volatile managed drives; and
        power conservation logic that operates in parallel with an emergency shutdown process in which an emergency power source is engaged and data and metadata are destaged from the volatile memory to non-volatile managed drives, the power conservation logic comprising power conservation actions that are serially implemented until enough reserve power is available to complete the emergency shutdown process.

12. The apparatus of claim 11 wherein the power conservation actions comprise instructions that reduce processor power level.

13. The apparatus of claim 11 wherein the power conservation actions comprise instructions that depower unused managed drives and associated interfaces.

14. The apparatus of claim 11 wherein the power conservation actions comprise instructions that park unnecessary processor cores.

15. The apparatus of claim 11 wherein the power conservation actions comprise instructions that depower host interfaces.

16. The apparatus of claim 11 wherein the power conservation actions comprise instructions that reduce processor clock speed.

17. The apparatus of claim 11 wherein the power conservation actions comprise instructions that reduce memory clock speed.

18. The apparatus of claim 11 wherein serially implementing ones of the plurality of power conservation actions comprises reducing system cooling.

19. The apparatus of claim 11 wherein the power conservation logic estimates power savings from each of the conservation actions.

20. The apparatus of claim 19 wherein the power conservation logic implements the power conservation actions serially in an order based on the estimated power savings.

* * * * *